US005531498A

United States Patent [19]

Kowall

[11] Patent Number: 5,531,498

[45] Date of Patent: Jul. 2, 1996

[54] VEHICLE BODY WITH POWERED LIFT TYPE TAILGATE

[75] Inventor: David J. Kowall, Hartland, Mich.

[73] Assignee: Chrysler Corporation, Auburn Hills, Mich.

[21] Appl. No.: 348,007

[22] Filed: Dec. 1, 1994

[51] Int. Cl.$^{6}$ .......... B60J 5/10

[52] U.S. Cl. .......... 296/146.4; 49/28; 49/280; 49/358; 296/56; 296/146.8

[58] Field of Search .......... 296/56, 146.4, 296/106, 76, 146.8; 49/324, 340, 139, 28, 280, 358

[56] References Cited

U.S. PATENT DOCUMENTS

| | | | |
|---|---|---|---|
| 3,422,572 | 1/1969 | Pollak | 49/280 |
| 3,713,472 | 1/1973 | Dozois | 160/189 |
| 3,716,945 | 2/1973 | Cooper et al. | 49/139 |
| 3,757,472 | 9/1973 | Rogakos | 49/40 |
| 4,728,141 | 3/1988 | Motazawa et al. | 296/37.16 |
| 4,813,303 | 3/1989 | Breezer et al. | 74/425 |
| 5,046,283 | 9/1991 | Compeau et al. | 48/138 |

FOREIGN PATENT DOCUMENTS

| | | | |
|---|---|---|---|
| 3636789 | 5/1988 | Germany | E05F 15/04 |
| 1-314620 | 12/1989 | Japan | B60J 5/10 |

*Primary Examiner*—David M. Mitchell
*Assistant Examiner*—Kia M. Robinson
*Attorney, Agent, or Firm*—Thomas G. Pasternak

[57] ABSTRACT

A passenger van tailgate hinged for swinging movement about a horizontal axis at its upper edge is forced upward to open by a pair of spring devices under the control of a powered actuator operating through cables. The actuator is mounted on the tailgate and includes an electric motor drivingly connected by a worm shaft and worm gear and additional reduction gearing to a pulley on which the cables are wound. The cables are secured at one end to the vehicle structure, extend along side the respective spring devices, and are wound at their other end in the same direction on the pulley. The tailgate is opened by operating the actuator motor to unwind the cables and allow the spring devices to open the tailgate at a rate determined by the speed of the motor. The tailgate is closed by operating the actuator motor in reverse to rewind the cables and compress the spring devices. A clutch maintains a drive connection between the worm gear and pulley to effect normal tailgate operation and is adapted to slip to allow manually applied force on the tailgate to operate same when the motor is not operating. There is also provision for shutting the actuator motor off when the tailgate encounters an obstacle during closure.

7 Claims, 3 Drawing Sheets

FIG 4
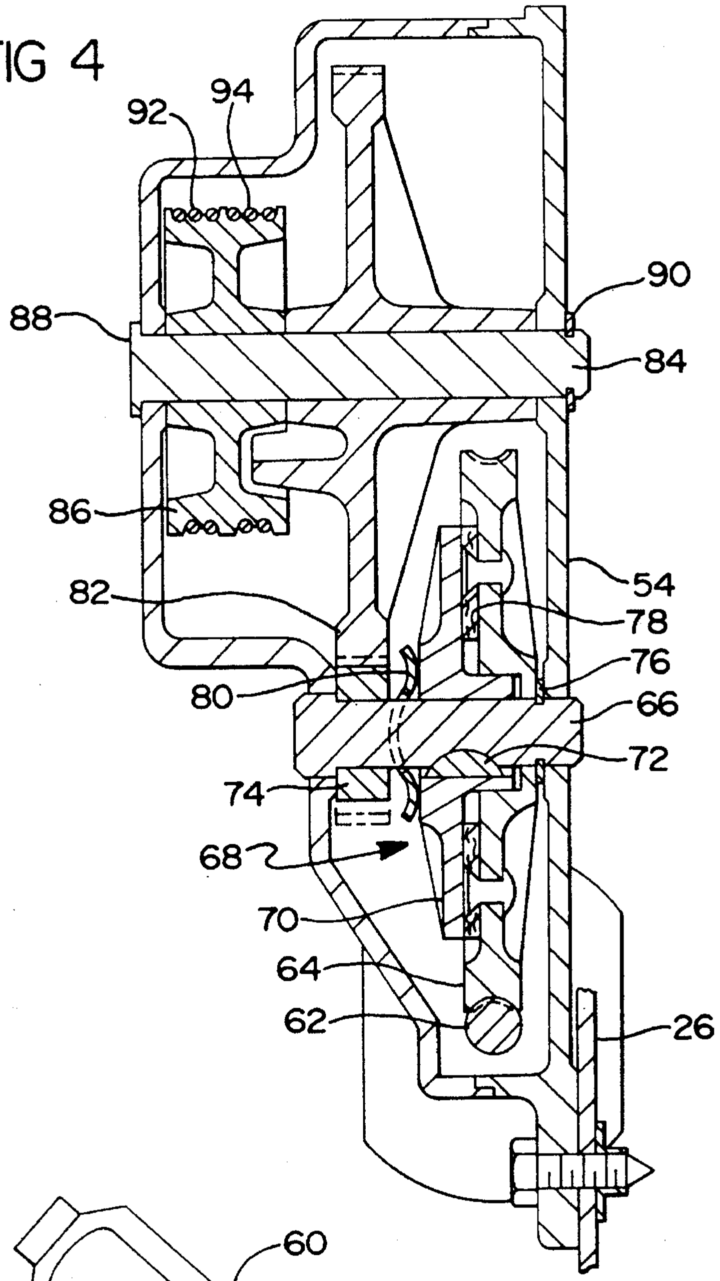
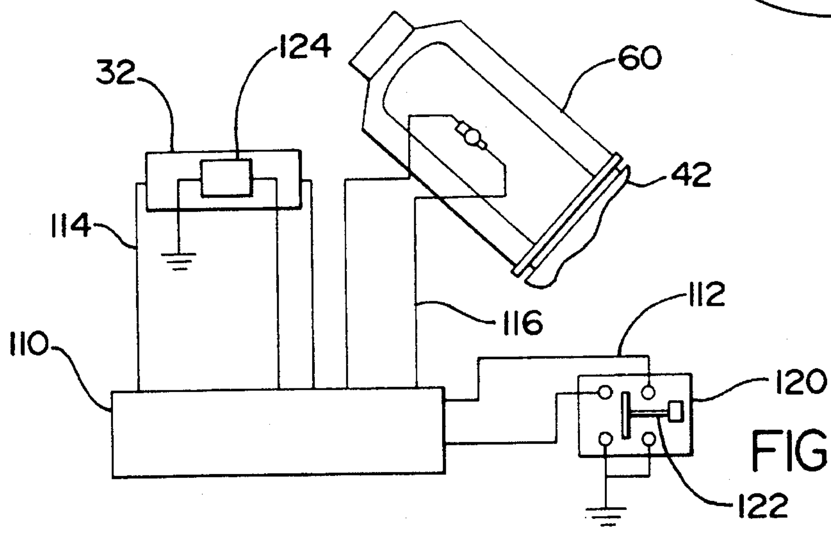
FIG 5

VEHICLE BODY WITH POWERED LIFT TYPE TAILGATE

TECHNICAL FIELD

This invention relates to vehicle bodies with a tailgate that is lifted to open and more particularly to power lift systems for opening and closing this type tailgate.

BACKGROUND OF THE INVENTION

In vehicle bodies such as the van type having a substantially vertical rear access opening, there is typically provided either a sideways type swinging tailgate that swings about a generally vertical axis and as a result requires little effort to open and close or a lift type tailgate that swings upward about a horizontal axis to open and as a result requires significant lifting effort to effect opening. For the convenience of the people using a vehicle having a lift type tailgate, it is desired that a power lift system be provided to relieve a person of the required lifting effort and particularly where the tailgate is a heavy singular gate or door that closes the entire rear access opening. However, there is limited space in the vehicle body for a power lift system with the capacity to handle the heavy lifting effort required of such a tailgate. Moreover, it is desirable that the tailgate be capable of being opened and closed manually independent of special conditioning of the power lift system and with minimum effort both as a matter of convenience and in the event the operation of the power lift system is not available for some reason such as a malfunction in the power lift mechanism or loss of power thereto.

Various forms of power lift tailgate systems have been proposed but they are typically complicated in structure and require considerable accommodating space in the vehicle body particularly where they use some form of spring system to assist in the operation of the tailgate such as by counterbalancing the weight of the tailgate. Furthermore, they typically require a control system and attendant components to switch between a power mode and a manual mode that will allow manual opening and closing free of the power lift mechanism.

SUMMARY OF THE INVENTION

The present invention offers a very simple, cost effective, space saving, easy to install, powered actuator system for a lift type tailgate having a singular electric motor powered actuator that controls the release of spring devices to lift the tailgate, collapses the spring devices to close the tailgate and is capable of releasing the tailgate for manual operation without having to be automatically or manually switched from its power mode to a manual mode. In the tailgate powered lift system of the present invention, separate spring devices are connected directly between the vehicle body structure and opposite sides of the tailgate and provide upwardly acting forces effective to fully lift the tailgate from its closed position to its wide open position rather than providing a counterbalancing effect. This permits the use of a singular electric motor powered tailgate actuator that is mounted directly on the tailgate and operates through cables to control opening of the tailgate by the spring devices and force closure of the tailgate against the spring devices.

The actuator comprises a reversible DC motor, a cable pulley, and a compact torque multiplying/speed reducing drive train including a pinion shaft and pinion gear drivingly connecting the motor to the cable pulley. A pair of cables are wound at their one end in the same direction on the cable pulley and are anchored at their other end to the vehicle body on opposite sides of the tailgate opening at a point adjacent where the respective spring devices are connected. The cables are guided on the tailgate to extend in opposite directions from the pulley and along side the tailgate to a point thereon adjacent where the respective spring devices are connected and are then guided along side the respective spring devices to their respective anchoring point on the vehicle body. The tailgate is opened by releasing the same from a latched condition and operating the actuator motor to unwind the cables and allow the spring devices to open the tailgate at a rate determined by the speed of the motor. The tailgate is closed by operating the actuator motor in reverse to rewind the cables and compress the spring devices.

In the actuator mechanism, a normally engaged clutch is strategically located in the drive train between the worm gear and cable pulley and operates to normally maintain a drive connection therebetween to effect normal tailgate opening and closing with the motor and is preset to slip to allow manually applied force on the tailgate to open and close same when the motor is not operating. In addition, the motor is operated with a microprocessor controller that detects when the tailgate encounters an obstacle such as a package, grocery cart, parking lane pylon, etc. in its closing movement. The controller detects such an occurrence by sensing an excessive motor current load and in that event shuts the motor off to allow removal of the obstacle before powered tailgate closure can continue.

Among the several features of the invention in addition to those mentioned above is that the lines of action of the cables are parallel with the spring devices thereby providing very efficient use of actuator force in collapsing the latter to close the tailgate. Another feature is that the clutch for manual tailgate operation in its preferred form is a simple, low cost, spring biased friction clutch that releases at a preset torque setting that can be factory adjusted to suit a particular tailgate installation. Another feature resides in the very compact arrangement of the spring devices and cables along side each other between the vehicle body and the tailgate. Still another feature is the inclusion in the actuator of a compactly arranged pinion gear and spur gear between the clutch and the cable pulley that multiplies the torque multiplying/speed reducing effect of the worm shaft and worm gear for greater mechanical advantage and larger speed reduction.

It is therefore an object of the present invention to provide a new and improved powered tailgate actuator system for a lift type tailgate on a vehicle body.

Another object is to provide a powered actuator system for a lift type tailgate on a vehicle body wherein the tailgate is opened by the force of spring devices acting directly thereon under the control of a motor powered actuator mounted on the tailgate that operates through cables connected to the vehicle body structure and wherein the actuator operating through the cables closes the lift gate against the tailgate opening spring devices.

Another object is to provide a powered actuator system for a lift type tailgate on a vehicle body wherein the tailgate is urged to open by spring devices and a motor powered actuator mounted on the tailgate operates through cables connected to the vehicle body structure to allow the spring devices to open the tailgate at a controlled rate and to collapse the spring devices to close the tailgate at the same controlled rate.

Another object is to provide on a vehicle body a hinged lift type tailgate operated by a powered actuator with cables and spring devices wherein the tailgate can be operated manually without power lift mode shifting.

Another object is to provide on a vehicle body a hinged lift type tailgate operated by a powered actuator and tailgate opening spring devices wherein the actuator controls the speed and degree of tailgate opening movement against the opening force of the spring devices.

Another object is to provide a hinged lift type tailgate on a vehicle body with a system of direct acting spring devices that urge opening of the tailgate and a powered cable system that controls the opening of the tailgate with the spring devices and pulls the tailgate closed against these spring devices and also allows manually positioning of the tailgate at any position without switching from a power mode to a manual mode.

Another object is to provide a hinged lift type tailgate on a vehicle body with a system of direct acting spring devices that urge opening of the tailgate and a powered cable system that controls the opening of the tailgate with the spring devices and pulls the tailgate closed against these spring devices and also allows manually positioning of the tailgate at any position without switching from a power mode to a manual mode and also stops closing the tailgate when an obstacle is encountered.

These and other objects, advantages and features of the present invention will become more apparent from the following description and accompanying drawings wherein:

BRIEF DESCRIPTION OF THE DRAWINGS

FIG. 4 is an enlarged view taken along the line 4—4 in FIG. 3 when looking in the direction of the arrows; and FIG. 5 is a diagrammatic view of the control portion of the actuator system in FIG. 1.

DETAILED DESCRIPTION OF THE DRAWINGS

Figure 1:
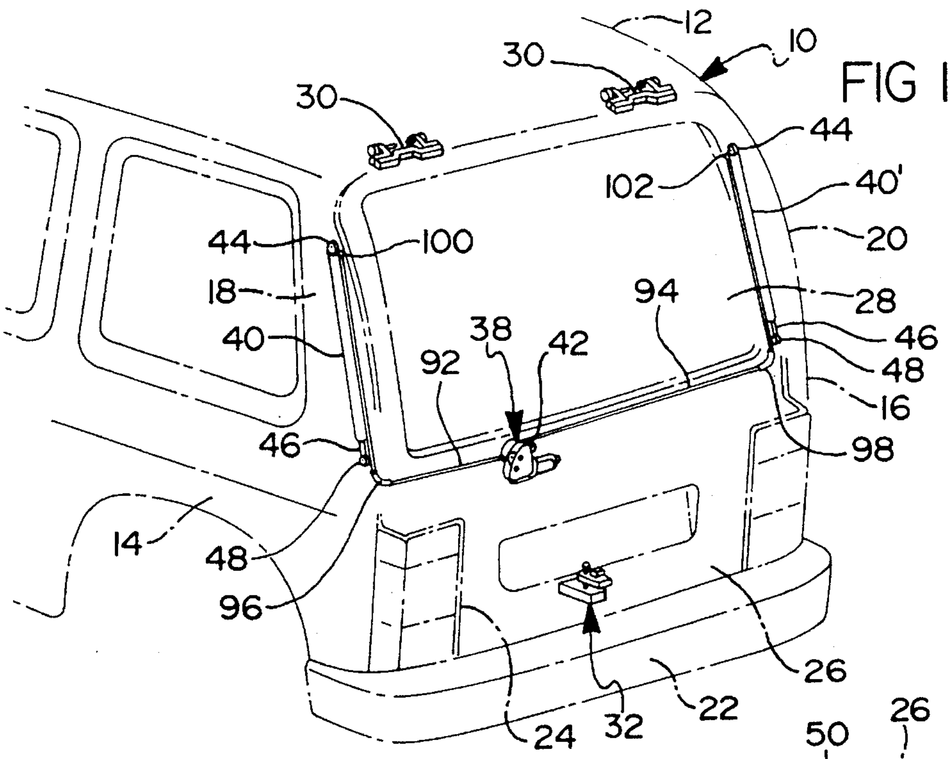
FIG. 1 is a fragmentary perspective view of the rear portion of a passenger van type vehicle body having a lift type tailgate operated by an actuator system according to the present invention, the tailgate being shown in its closed position.
Figure 2:
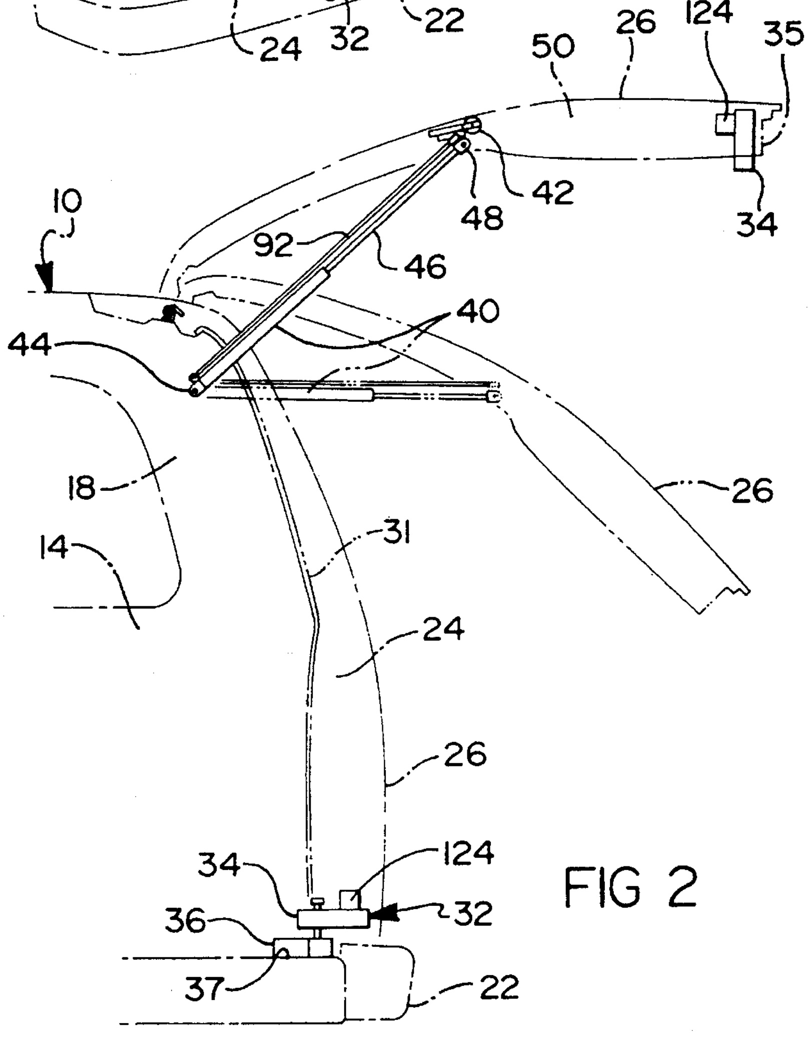
FIG. 2 is an enlarged side view of FIG. 1 illustrating the tailgate in a partially open position and in its wide open position.

Referring to FIGS. 1 and 2, there is illustrated in phantom lines the rear portion of a passenger van type vehicle body designated generally as 10 including a roof structure 12, a pair of left and right quarter panel structures 14 and 16 and a pair of left and right body pillars 18 and 20 interconnecting the roof structure and the respective quarter panel structures. The above body structures including the pillars co-operate with a laterally extending rear bumper structure 22 in defining a generally vertical rear opening 24 that provides access to the interior of the vehicle body and is closed and opened by a lift type tailgate or rear door 26 having a window 28. The tailgate 26 is mounted at its upper lateral edge with a pair of hinges 30 on the roof structure for swinging movement about a horizontal lateral axis. A seal 31 is mounted along the edge of the rear opening 24 and the tailgate is swingable between the closed position shown in FIG. 1 where it engages this seal and closes the opening 24 and a wide open position where it completely uncovers the opening for free access to the vehicle body interior and assumes an upwardly angled uplifted position above horizontal as shown in FIG. 2.

The tailgate 26 is secured in its closed position by a suitable conventional power lock system 32 including a solenoid operated latch assembly 34 on the bottom edge 35 of the tailgate that engages a solenoid operated moveable striker assembly 36 on the tailgate sill 37 of the vehicle body.

The tailgate 26 is opened and closed by a powered actuator system generally designated as 38 including a pair of identical gas springs 40 and 40' and an actuator mechanism 42 that is mounted on the tailgate. The gas springs 40 and 40' are mounted parallel to each other at opposite sides of the rear access opening 24 with the base end of their cylinder 42 connected by a pivot mounting 44 to the respective opening defining rear pillars 18 and 20 at a point near their top. The gas springs are connected at the end of their projecting piston rod 46 by a pivot mounting 48 to the respective longitudinal edge 50 of the tailgate at a point about midway of the height of the tailgate and below the level of the lower edge of the window 28.

The gas springs 40 and 40' which are also commonly referred to as gas struts are of the type currently used with the manually operated rear deck closures on hatch back type vehicle bodies but which require considerably less lifting effort and wherein the gas struts are typically used to counterbalance the weight of the deck closure as it is opened and closed manually. In the present arrangement, the gas springs 40 and 40' are not used as counterbalancing devices and instead are made to produce sufficient lifting forces on the tailgate that force it through its entire upward swinging range of movement from its substantially vertical closed position in FIG. 1 to an uplifted upwardly angled wide open position which is the uppermost of the two positions illustrated in FIG. 2. The gas springs 40 and 40' thus overcome the weight of the tailgate throughout its range of movement but as a result require a considerably greater force to effect their collapse to close the tailgate as compared with springs providing a counterbalancing effect.

Figure 3:
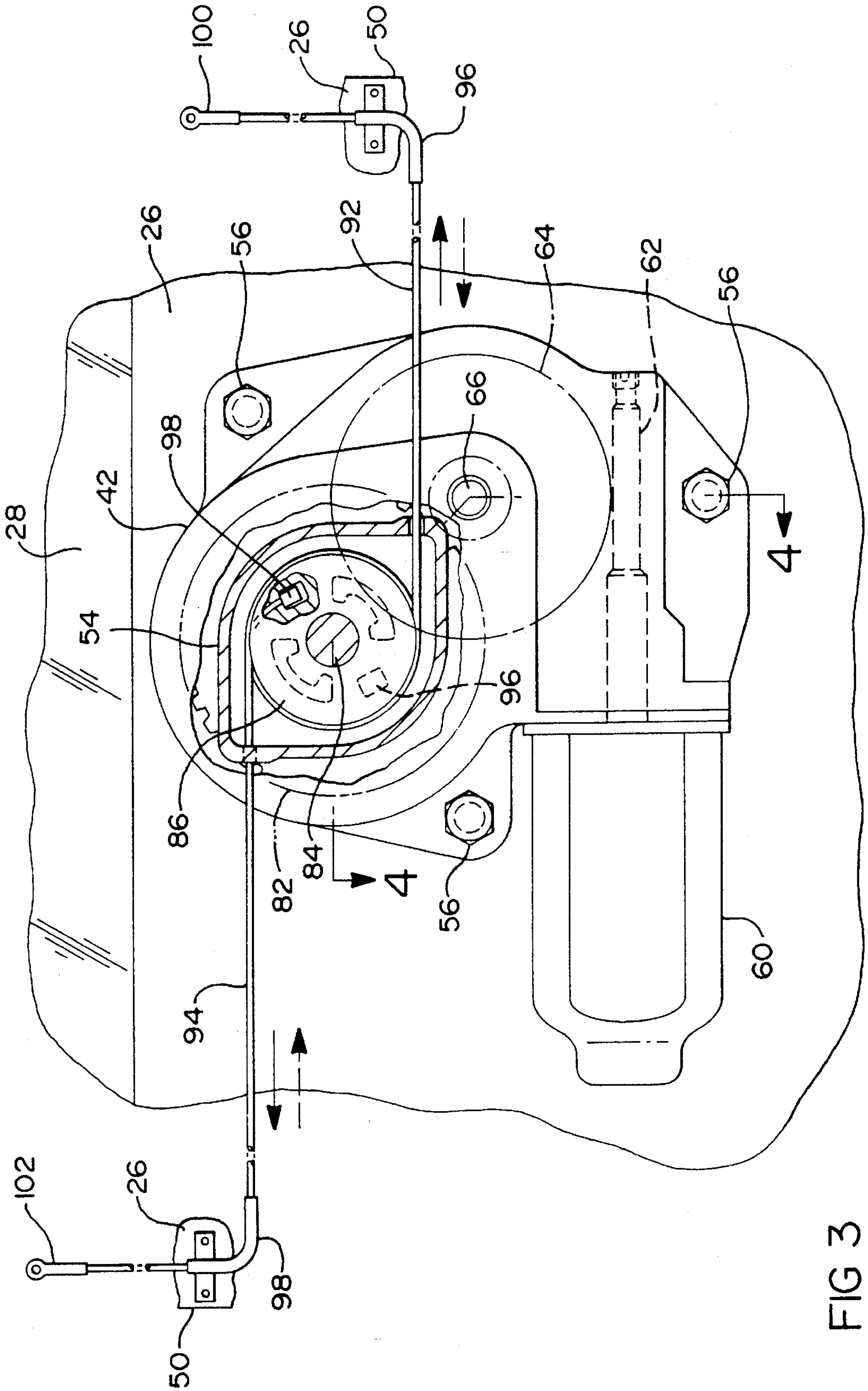
FIG. 3 is an enlarged view of the interior side of the tailgate in FIG. 1 with the interior trim panel removed and with the cables shown in an exploded manner from their connection to the vehicle body.

The powered tailgate actuator mechanism 42 is mounted on the interior side of the tailgate frame structure below the window 28 and in line with the tailgate attaching points 48 of the gas springs 40 and 40'. Referring to FIGS. 3 and 4, the actuator mechanism is hidden behind an interior tailgate trim panel (not shown) and comprises a two-piece housing 54 that is secured with bolts 56 to a bracket 58 that is welded to the tailgate frame structure. A DC motor 60 is mounted on the housing 54 and powers a worm shaft 62 that is mounted in the housing. The worm shaft 62 meshes with a worm gear 64 that is rotatably supported on a worm gear shaft 66 and is normally clutched thereto by a spring biased clutch generally designated as 68. The gear shaft 66 is mounted at right angles to the worm shaft and a clutch pressure plate 70 that is a part of the clutch assembly is received on the gear shaft and fixed thereto by a woodruff key 72. A pinion gear 74 is also similarly fixed to the gear shaft 66 and bears against an interior side of the housing 54. A snap ring 76 mounted in a groove on the gear shaft 66 between the outboard side of the worm gear 64 and an interior side of the housing 54 restrains the worm gear from movement on this shaft away from the pressure plate 70.

The clutch assembly further includes an annular clutch pad 78 that is riveted to one side of the worm gear and a clutch spring 80 in the form of a wave washer is received on the gear shaft 66 between the pinion gear 74 and the pressure plate 70. The clutch spring 80 is loaded in its assembly and forces the pressure plate 70 to engage the clutch pad 78 to normally clutch the worm gear 64 to the worm gear shaft 66 and is operable to release or disengage the clutch when manual force of a certain magnitude is applied to the tailgate as described in more detail later.

The pinion gear 74 meshes with a spur gear 82 of larger pitch diameter that is fixed with a woodruff key (not shown) to a second gear shaft 84 that is rotatably mounted in the housing 54 parallel with the gear shaft 66. A cable pulley 86 is received on the gear shaft 84 within the housing 54 adjacent the spur gear 82 and is also fixed to this gear shaft by a woodruff key (not shown) and thus normally connected by the clutch 68 to be driven by the motor 60. The gear shaft 84 is retained in place by being formed at one end with a head 88 that abuts with the exterior of the housing and by the provision of a snap ring 90 that is received in a groove on the other end of this shaft where it projects outward of the housing. The pinion gear 74 and spur gear 82 thus provide a speed reducing/torque multiplying geared drive between the worm gear and the cable pulley that multiplies that provided by the worm shaft and worm gear to further reduce the torque required of the motor to close the tailgate and also reduce the speed of the cable drive to a slow movement.

Two cables 92 and 94 are attached at their one end to the cable pulley 86 by a lug 96 and 98 that is fixed to this end of the respective cables and captured in a pocket in the cable pulley. The cables 92 and 94 are wound in the same direction about the cable pulley and extend in opposite directions therefrom through openings in the actuator housing 54. The cables 92 and 94 extend from the cable pulley along the inner side of the tailgate structure and are received by a right angle cable guide 96 and 98, respectively, that is attached to the tailgate structure at a point adjacent the tailgate mounting point of the respective gas springs 40 and 40'. The cable guides 96 and 98 locate the respective cables 92 and 94 in a generally horizontal position on the tailgate and guide the cables on a path at right angles thereto toward the vehicle body where there are attached at their other end by a cable anchor 100 and 102 to the respective rear pillars 18 and 20. The cable anchoring points are located at a point on the pillars adjacent the pillar mounting point of the respective gas springs and the cable anchoring points and cable guides thus locate the cables along side the respective gas springs so as to operate in parallel relationship therewith for maximum efficiency in controlling the opening of the tailgate with the force of the gas springs and forcing the closure of the tailgate against the gas springs. This location of the cables along side the gas springs also results in a very compact arrangement characterized by the narrow column of space they occupy between the vehicle body and the tailgate.

Referring to FIG. 5, the tailgate actuator mechanism 42 is controlled with a microprocessor controller 110 that includes a lift gate actuator circuit 112, a tailgate power lock control circuit 114, and an actuator motor control circuit 116. The actuator control circuit includes two tailgate actuating switches 120 (the details of only one being shown). One of the switches 120 is mounted on the driver side door or the instrument panel (not shown) and the other is preferably mounted on a hand carried key fob (not shown) and adapted to transmit electronic signals to the controller to operate the tailgate actuator motor from a remote location outside the vehicle. The switches 120 are of the three-position type having a single actuator 122 that is moveable laterally as viewed in FIG. 5. When the switch actuator is in a center position as shown the switch is open or off. On lateral movement of the switch actuator in one direction from this off position to a second or tailgate opening position, the actuator closes one set of switch contacts to apply a ground signal to the controller to (1) activate the power lock control circuit causing the striker 36 to move backward and the latch assembly 34 to release in a conventional manner, and (2) power the motor 60 at a constant speed in a tailgate opening direction wherein the cables unwind from the cable pulley. On movement of the switch actuator in the opposite direction from the off position to a third or tailgate closing position, the actuator closes another set of contacts that are connected to apply a ground signal to the controller to power the motor 60 in a tailgate closing direction rewinding the cables until the latch assembly 34 engages the striker 36. On such engagement, a switch 124 in the latch assembly is operated thereby and applies a ground signal to the controller to deactivate the motor control circuit and activate in normal manner the lock control circuit causing the striker to pull the tailgate completely closed against the tailgate seal 31 at which point the system then stops. The microprocessor controller 110 includes torque sensing circuitry of a suitable conventional type that detects the motor current load and is set to open the motor control circuit 116 to stop the motor and thereby tailgate movement when this load exceeds a certain level during tailgate closure as described later.

Describing now the operation of the tailgate operating system and the setting of the clutch 68 and starting with the tailgate closed as shown in FIG. 1, either one of the tailgate actuating switches 120 may be switched to its tailgate opening position to move the striker rearward, unlatch the power latch and power the actuator motor 60 at constant speed in a direction that unwinds the cables 92 and 94 from the cable pulley 86 as indicated by the solid line arrows in FIG. 3. The unwinding of the cables permits the gas springs 40 and 40' to then swingingly lift the tailgate upward from its closed position toward its full open position with the speed of the motor 60 controlling the speed of the tailgate opening movement. The actuator motor can be stopped at any time with the actuating switch being utilized to hold the tailgate in a partially open or intermediate position with the cables 92 and 94 as shown in FIG. 2 or the motor operation can be continued as desired with operation of the actuating switch until the tailgate reaches its wide open position shown in FIG. 3. To close the tailgate, either one of the actuating switches 120 is then switched to its tailgate closing position to reverse the direction of the actuating motor causing the cable pulley 86 to rewind the cables 92 and 94 and collapse the gas springs 40 and 40' while pulling down the tailgate toward its closed position. This rewinding of the cables is indicated by the dash line arrows in FIG. 3. And again the tailgate can be stopped and held by the cables at any intermediate position with the actuating switch being utilized. When the tailgate closure reaches the point where the latch assembly engages the moveable striker, the motor 60 is stopped by the actuation of the striker operating switch 124 in the latch assembly by the striker assembly which switch action then activates the power lock control circuit to pull the tailgate completely closed on the seal with the moveable striker at which point the system stops.

During the above opening and closing operation of the tailgate, the clutch 68 maintains the drive from the worm gear 64 to the cable pulley 86 by setting the clutch apply load with the clutch spring 80 at a certain limited value or load capacity that will effect tailgate closure against the force of the gas springs 40 and 40' without clutch slippage but will allow the clutch to slip when this normal closing force required of the actuator is exceeded by a certain external load applied to the tailgate. The clutch load capacity is limited to the extent that when the tailgate is stopped with the actuator motor 60 and held in any of it positions with the actuator mechanism, a person can then apply manual force to the tailgate that is effective to slip the clutch against the reaction force of the motor connected worm shaft and either close or fully open the tailgate or adjust it to any intermediate position as desired and thus without requiring the use of the powered actuator. This manual operation offers convenience to the vehicle user in then not having to operate one of the actuating switches and also allows tailgate opening and closing by the vehicle user in the event the actuator operation is not available for some reason such as a malfunction or loss of power thereto. The clutch setting is limited so that the manually applied torque on the tailgate required to slip the clutch 68 is greater than that required of the motor powered cable pulley 86 in its closing action against the gas springs only by an amount that establishes a suitable or non-excessive manual effort for a typical vehicle user.

If during powered tailgate closure movement the tailgate encounters an obstacle such as a package, grocery cart, parking lane pylon, etc. in its path, the motor control circuit 116 detects the resulting excessive or unusual torque demand by sensing the motor current load and is set to open the motor circuit at a relatively high current load above which damage at the tailgate could occur should it continue to be powered. The opening of the motor circuit stops the motor to prevent further forced closure of the tailgate until this overload torque on the motor is relieved at which point the motor circuit reactivates with the accompanying reduction in the motor current load. This threshold overload level is set at a level slightly above that of the manually applied torque described above to slip the clutch 68 for manual closing of the tailgate against the force of the gas springs. The motor circuit remains open until the obstacle is removed and with the motor stopped there can be no possible clutch slippage occasioned by the motor that would wear same while the obstacle remains in the tailgate path. In addition, the actuator switch being utilized may then be opened to prevent resumption of the actuator motor should the obstacle require considerable time to be completely removed from the path of the tailgate and the tailgate may then be manually opened through slippage of the clutch to clear the obstacle.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may by made. It is therefore to be understood that within the scope of the appended claims, the invention may be practiced otherwise than as specifically shown and described.

What is claimed is:

1. In combination, a vehicle body having a substantially vertical rear opening, a tailgate adapted to open and close said rear opening, hinge means mounting said tailgate on said vehicle body for swinging movement about a horizontal hinge axis located adjacent an upper edge of said tailgate so that said tailgate on upward lifting movement is moveable from a closed position closing said rear opening to a wide open position fully opening said rear opening, a pair of spring devices, each of said spring devices connected at opposite ends thereof to said tailgate and to said vehicle body at one side of said rear opening and so as to be parallel with the other spring device, said spring devices operable to together swing said tailgate upward from said closed position to said wide open position, a tailgate actuator mechanism mounted on said tailgate, said actuator mechanism comprising a reversible electric motor, a cable pulley, drive means operatively connecting said motor to said cable pulley, a pair of cable guides, each said cable guide mounted on said tailgate at a point adjacent where one of said spring devices is connected, a pair of cables, each of said cables connected to said vehicle body at a point adjacent where one of said spring devices is connected, each said cable guide receiving one of said cables and guiding same from a path along side one of said spring devices to a path along side said tailgate in line with said cable pulley, said cables connected to and wound in the same direction around said cable pulley, said motor operable to turn said cable pulley in one direction to unwind said cables to allow said spring devices to open said tailgate at a rate determined by the speed of said motor, and said motor operable to turn said cable pulley in the opposite direction to rewind said cables to collapse said spring devices and close said tailgate.

2. In combination, a vehicle body having a substantially vertical rear opening, a tailgate adapted to open and close said rear opening, hinge means mounting said tailgate on said vehicle body for swinging movement about a horizontal hinge axis located adjacent an upper edge of said tailgate so that said tailgate on upward lifting movement is moveable from a closed position closing said rear opening to a wide open position fully opening said rear opening, a pair of spring devices, each of said spring devices connected at opposite ends thereof to said tailgate and to said vehicle body at one side of said rear opening and so as to be parallel with the other spring device, said spring devices operable to together swing said tailgate upward from said closed position to said wide open position, a tailgate actuator mechanism mounted on said tailgate, said actuator mechanism comprising a reversible electric motor, a cable pulley, drive means including a normally engaged clutch operatively connecting said motor to said cable pulley, a pair of cable guides, each said cable guide mounted on said tailgate at a point adjacent where one of said spring devices is connected, a pair of cables, each of said cables connected to said vehicle body at a point adjacent where one of said spring devices is connected, each said cable guide receiving one of said cables and guiding same from a path along side one of said spring devices to a path along side said tailgate in line with said cable pulley, said cables connected to and wound in the same direction around said cable pulley, said motor operable to turn said cable pulley in one direction to unwind said cables to allow said spring devices to open said tailgate at a rate determined by the speed of said motor, said motor operable to turn said cable pulley in the opposite direction to rewind said cables to collapse said spring devices and close said tailgate, and said clutch having a load capacity sufficient to effect normal tailgate opening and closing by said motor and to slip to allow an external force on said tailgate to open and close same.

3. A combination as set forth in claim 2, and said spring devices being gas springs.

4. A combination as set forth in claim 3, and said gas springs and said cables between said vehicle body and tailgate being parallel with each other.

5. A combination as set forth in claim 2, and a controller controlling said motor that detects an excessive amount of motor torque when said tailgate encounters an obstacle during motor powered closing movement by sensing motor current load and stops the motor.

6. A combination as set forth in claim 2, and said drive means further including a worm shaft coupled to said motor, a worm gear engaging said worm shaft, and said clutch providing a drive connection between said worm gear and said cable pulley.

7. A combination as set forth in claim 6, and said drive means further including reduction gearing providing a drive connection from said clutch to said cable pulley.

* * * * *